Figure 1:
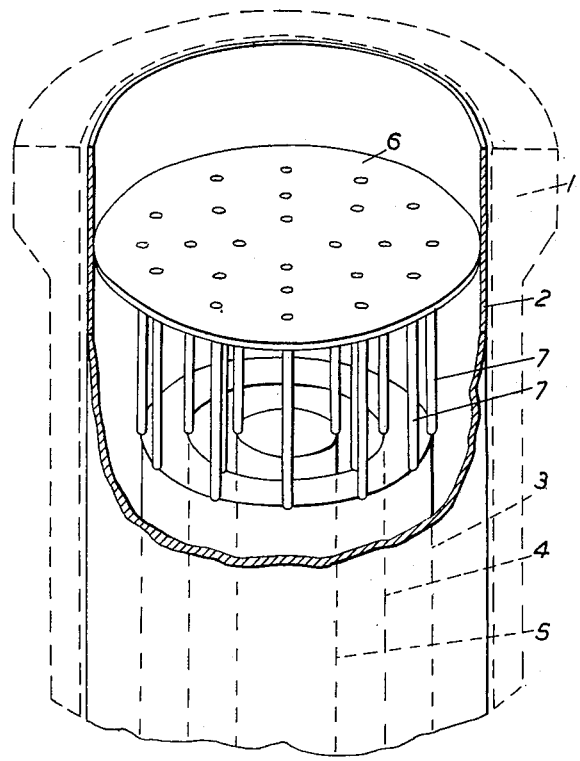
Figure 2:
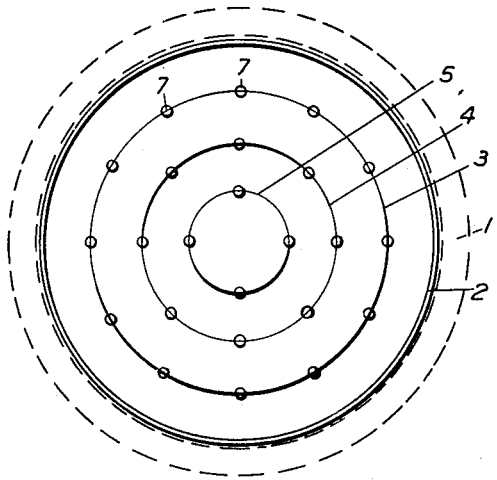

Nov. 29, 1955    M. A. E. HODGSON    2,725,403
HYDRATION OF OLEFINS
Filed July 23, 1951

Inventor
Maurice Arthur Eric Hodgson

By Cushman, Darby & Cushman
Attorneys

United States Patent Office 2,725,403
Patented Nov. 29, 1955

2,725,403

HYDRATION OF OLEFINS

Maurice Arthur Eric Hodgson, Norton-on-Tees, England, assignor to Imperial Chemical Industries Limited, a corporation of Great Britain Application July 23, 1951, Serial No. 238,069

Claims priority, application Great Britain August 4, 1950

3 Claims. (Cl. 260—641)

Various reactions, such as the hydrogenation of high-boiling liquids and the direct hydration of olefines, require a component or components predominantly in the liquid phase and a component or components predominantly in the vapour phase, the two components having to be contacted with each other over a solid catalyst which may be in the form of pellets. The liquid portion of the material fed to the converter or part of this portion may be required for the reaction itself, and/or it may be required for the purpose of scrubbing out the reaction product. In either case the maximum output of desired product requires intimate contact between the liquid and vapour phases and between one or both of these phases and the catalyst.

The simplest form of converter would consist of a cylindrical vessel of suitable dimensions packed with catalyst pellets or other suitable form of solid catalyst, the material which is predominantly liquid under the conditions of reaction being fed to the top of the converter and distributed uniformly over the catalyst bed, the predominantly vapour phase reactant being caused to flow co-currently or countercurrently as desired.

This type of converter suffers from the following disadvantages:

(1) It is difficult to maintain good distribution of the liquid phase over the catalyst throughout the converter as it is necessary to obtain a good output product in the case when the liquid takes part in the reaction. This difficulty is particularly serious if the catalyst consists of pellets small compared with the diameter of the converter and/or of material which is not readily wetted by the liquid. The liquid then tends to form a limited number of relatively large channels.

(2) At constant space velocity, i. e. constant volume fed per hour per unit of bulk volume of catalyst, the liquid loading, i. e. the quanity of liquid fed per hour to unit cross section of the catalyst bed, is proportional to the depth of the bed, which may be 30 feet or more in commercial scale converters. The large liquid loading under these conditions can lead to flooding of the bed, with consequent loss of output in cases where the reaction takes place predominantly in the vapour phase; it can also under certain circumstances, particularly in the case of high pressure reactions, cause serious catalyst erosion, thereby shortening the life of the catalyst and contaminating the product with catalyst material.

It is an object of this invention to provide a reactor and reaction conditions by which these difficulties can be overcome.

According to the invention, there is provided a converter for reactions in which at least one compound in the liquid phase such as a reactant or solvent is contacted with at least one further component which may be in the liquid or gaseous phase and in which there is present at least one solid components such as a catalyst or heat reservoir, which converter contains at least one sheet of gauze positioned to ensure that any part of said solid component or components is within a desired maximum horizontal distance from such sheet, the gauze consisting of a material which under reaction conditions is wetted by said liquid component or components and having a weave in the form of galloon netting, and means for feeding said liquid phase component or components on to the said gauze, said sheet of gauze being positioned to ensure that liquid flows from its upper to its lower part by gravity.

Preferably the sheets are disposed vertically. Also preferably the weft threads, which in galloon netting are arranged close to one another, are disposed horizontally. The warp threads, which in galloon netting are substantially straight, are then preferably disposed vertically.

The gauze, owing to its galloon netting weave, is self-wetting i. e. liquid flowing within its interstices will spread to wet a substantial area without the need of pre-flooding.

In this specification the term "gaseous" is intended to refer to those substances which are usually gaseous and those which are in the vapour form under the conditions of operation.

It is to be understood that the material of the gauze will be so chosen that it is not attacked under reaction conditions.

The gauze may be arranged in any of several forms, e. g. with a continuously spiral plan view, as a series of coaxial cylinders or as a series of parallel sheets. It should preferably be so arranged that no part of the catalyst bed is more than about 2 inches or, more preferably, about 1 inch from the nearest gauze surface.

The reactor design according to this invention is applicable to a large variety of reactions, particularly, though not exclusively, to those which take place partly in the liquid and partly in the gaseous phase, and particularly, though not exclusively, to catalytic reactions, especially when a solid catalyst is used. Examples of such reactions are the carbonylation of olefines by carbon monoxide and hydrogen to aldehydes or alcohols using solid catalysts which will hereinafter be briefly referred to as "carbonylation" and the hydrogenation of creosote or fuel oil using solid catalysts. A particularly important example of the application of the invention is that to the direct catalytic hydration of olefines such as ethylene and propylene at high pressure, say 250 atmospheres, and high temperatures, say 280° C. to 300° C.

A converter constructed according to the invention is illustrated in perspective, partly cut away, and in plan, in the single figure of the accompanying drawing. In this figure, 1 is the converter shell and 2 a catalyst basket extending along most of the length of the converter. The basket contains three coaxial cylinders of galloon netting indicated at 3, 4 and 5, and is filled in operation with catalyst material, preferably substantially up to the top ends of cylinders 3, 4 and 5. The liquid material flows down the converter through a distributor plate 6 having three circular rows of openings corresponding to the cylinders 3, 4 and 5, a tube 7 being connected to each of these openings, so as to direct the liquid on to the cylinders. The gaseous or vaporous material may be fed co-currently or countercurrently to the liquid flow as desired.

Example

A cylindrical converter for the direct catalytic hydration of propylene to isopropanol over a solid pelleted catalyst essentially consisting of a blue oxide of tungsten had an overall height of 70 feet obtained by operating three shorter converters in series. These three vessels will hereinafter be referred to as one single converter. Its diameter was 3 feet 8 inches. It was operated at a pressure of 250 atmospheres and a temperature of 270° C. by introducing into it, at a rate of 3 litres per litre of catalyst bulk space per hour, 7 parts by weight of water and 1 part by weight of propylene. It was found that the output of isopropanol per litre of catalyst bulk space per hour was 0.14 kg. The converter was then modified by fitting it with 11 cylinders of stainless steel galloon netting all coaxial with the converter and spaced at regular intervals of 2 inches so that no point in the converter was more than one inch distant from the nearest wire cylinder. Upon operating the modified converter as before it was found that the isopropanol output had risen to 0.20 kg. per litre of catalyst bulk space per hour.

I claim:

1. A process of conducting the hydration of ethylene and propylene at 280° C. to 300° C. under superatmospheric pressure in the presence of a pelleted blue oxide of tungsten catalyst which comprises providing a reaction space having at least one sheet of galloon netting capable of being wetted by the liquid components positioned and shaped to divide the reaction space into a number of substantially vertical elongated compartments each containing the solid catalyst, the arrangement being such that no part of the catalyst bed is more than 2 inches from the nearest netting surface, feeding water to the top of the galloon netting, feeding the olefine to the reaction zone while maintaining the temperature and pressure of the reactants and within the reaction zone within limits favoring the reaction.

2. A process as recited in claim 1 in which the weft threads of the galloon netting are horizontally positioned.

3. A process as recited in claim 1 in which the said arrangement of galloon netting is such that no part of the catalyst bed is more than about 1 inch from the nearest netting surface.

References Cited in the file of this patent

UNITED STATES PATENTS

| Number | Name | Date |
|---|---|---|
| 752,165 | Hasenbach | Feb. 16, 1904 |
| 1,899,463 | Cederberg | Nov. 29, 1932 |
| 2,103,672 | Heraeus | Dec. 28, 1937 |
| 2,424,248 | Melvill | July 22, 1947 |
| 2,470,652 | Scofield | May 17, 1949 |
| 2,536,768 | Reynolds et al. | Jan. 2, 1951 |
| 2,546,479 | Sodano | Mar. 27, 1951 |
| 2,548,966 | Gilmore | Apr. 17, 1951 |
| 2,615,699 | Dixon | Oct. 28, 1952 |